United States Patent Office 2,873,263
Patented Feb. 10, 1959

2,873,263
POLYMERIZATION OF UNSATURATED COMPOUNDS IN THE PRESENCE OF BACTERICIDAL PHENATES OF PHENOLS AND THIOPHENOLS

Joginder Lal, Philadelphia, Pa., assignor to H. D. Justi & Son, Inc., Philadelphia, Pa., a corporation of Pennsylvania No Drawing. Application August 6, 1954
Serial No. 448,382

7 Claims. (Cl. 260—45.4)

This invention relates to the methods for producing resinous materials which are antibacterial in their properties. It also relates to the polymeric products which are antibacterial in character.

It is well known that many phenols or thiophenols possess antibacterial properties. It is desirable to produce polymeric materials by polymerizing monomers containing these antibacterial materials. It is also well known that phenols or thiophenols act as inhibitors in the process of polymerization of monomers such as alkyl methacrylates, alkyl acrylates, styrene, substituted styrenes, vinyl esters, etc.

I have discovered that if these phenols or thiophenols are converted into their salts, such as their alkali salts or salts of polyvalent metals, etc. and these salts are carefully purified so as to eliminate all free phenols or thiophenols, then these salts of phenols or thiophenols do not inhibit the polymerization of monomers.

I have discovered that these salts of phenols or thiophenols not only do not interfere with the polymerization brought about by peroxides, light, heat or radiation, but also do not disturb so called activated polymerization or free radical polymerization of substituted ethylene monomers whereby polymerization is brought about by the addition of suitable promoters or activators like amines, etc. to the polymerization mass containing the peroxy type catalyst.

I have also discovered that the antibacterial agents thus incorporated into the resin are capable of preventing the growth of bacteria not only on the surface of the resin but also exhibit an appreciable zone of inhibition around the resin sample. The antibacterial action of the resin lasts for an appreciably long time.

The materials which can be used in this manner thus comprise any of the aromatic antibacterial phenols or thiophenols, these including the group of phenols, thiophenols, substituted phenols, substituted thiophenols and organometallic derivatives of carboxy phenols and carboxy thiophenols such as salicylates and thiosalicylates, as illustrated by the general formulae

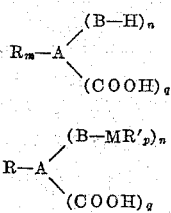

where
H is hydrogen.
B is oxygen or sulfur.
A is an aromatic nucleus such as benzene, naphthalene, anthracene, biphenyl, etc. or a heterocyclic nucleus such as pyridine, quinoline, isoquinoline, etc.
R represents any substituent group on aromatic or hetero cyclic nuclei. The various groups on a nucleus may be identical or different and can occupy any and every available position.
R' represents alkyl, aryl or halogen groups. These may be similar or dissimilar from one another.
M represents a bivalent or polyvalent metal such as copper, zinc, lead, tin, mercury, arsenic, antimony, bismuth, etc.
$p$ represents the number of R' groups. Thus, if the metal M is bivalent, $p=1$; if M is trivalent, $p=2$.
$m$ represents the number of substituent groups on the nucleus; it can be zero.
$n$ represents the number of phenolic or thiophenolic groups on the nucleus. Its value may vary from one to three. Thus the value of $n$ is 2 for resorcinol.
$q$ represents the number of carboxy groups on the nucleus. Its value may vary from zero to three. Thus in the case of salicylic acid, $q=1$ and in the case of p-chlorophenol, $q=0$.

The sum of $m$ and $q$ should not exceed the number of available positions for complete substitution on a given phenol or thiophenol.

The acidic hydrogen of phenols, thiophenols, substituted phenols or substituted thiophenols may be replaced by monovalent, divalent or trivalent cations. In the case of carboxy phenols and carboxy thiophenols such as salicylates or thiosalicylates, the acidic hydrogen or phenolic or thiophenolic group may be replaced by metal-alkyl or metal-aryl groups to give organo-metallic derivatives of divalent or polyvalent metals, such as copper, zinc, lead, tin, mercury, arsenic, antimony, bismuth, etc. In these organo-metallic derivatives of salicylates or thiosalicylates, the hydrogen of the carboxylic group may also be replaced by monovalent, divalent or polyvalent cations to form salts.

Resins, in general, are not antiseptic. Bacteria and fungi can grow on and around the resinous material. In airplanes, particularly in tropical climates, fungi often grow on wind screens and reduce visibility. Plastic floor coverings in hospitals are not free from bacteria and fungi. This invention thus contributes greatly in these and many other fields where antibacterial resins are desirable. The use of antibiotics such as aureomycin, streptomycin, bacitracin, chloramphenicol, etc. has been suggested in dental cements and direct resin filling materials. The solubility and relatively unstable character of these antibiotics reduces their usefulness to a short term. However, the resinous materials, as obtained by my invention, can retain their antibacterial activity over a short time or a long time, depending upon the solubility of the antibacterial material employed. When a relatively insoluble antibacterial is employed, the activity can last over a long period of time.

The antibacterial activity of resin samples containing antibacterial material was tested by placing the resin sample ½" x ½" x ⅛" in blood agar base at 37° C. which was inoculated with 1 ml. of undiluted saliva obtained by chewing paraffin. The testing was carried out under aerobic and anaerobic conditions. The zones of inhibition were recorded after 48 hours. These zones of inhibition varied from 0.1 cm. to 3.0 cm. depending upon the concentration and the solubility of the antibacterial material. Then experiments were repeated using blood agar base which was inoculated with undiluted saliva and horse serum. Similar zones of inhibition were recorded under aerobic and anaerobic conditions.

Undiluted human saliva was used in the above experiments because it contains a broad spectrum of aerobic and anaerobic organisms which are resistant to antibacterials. According to my experience, it is easier to control the growth of Staphylococcus aureus than that of the variety of organisms found in saliva. Common skin-surface and airborne bacteria can be easily controlled. Horse serum was used along with saliva in some of the culture plates to remove the possibility of other factors than the resin giving bacterial inhibition.

The antibacterial resins may be prepared in a number of ways. Bulk, emulsion suspension or solution methods may be used in polymerizing the monomer. For example, the monomer containing the antibacterial material, in solution, emulsion or in suspension, may be polymerized by the aid of heat or light or heat and light in the presence or absence of polymerization catalyst at subatmospheric, atmospheric, or superatmospheric pressure. Instead of using monomeric material, one may start with partially polymerized materials or with mixtures of monomers and partially polymerized materials. Another method of producing antibacterial resinous materials is to mix the monomer with a polymer and the antibacterial material, and bring about the polymerization of the entire mass by the application of heat or light or heat and light in the presence or absence of polymerization catalyst at subatmospheric, atmospheric or superatmospheric pressure. However, it is an important feature of the invention that the salt of the aromatic phenol or thiophenol be incorporated in a condition wherein it is free from inhibiting phenol or thiophenol into the reaction mixture containing a substituted ethylene polymerizable monomer at a stage in the polymerization reaction before the monomer is converted by polymerization into the finally polymerized resin, thereby insuring uniform and homogeneous distribution of the non-inhibiting antibacterial phenate in the finally polymerized resin.

Still another method of producing antibacterial resinous materials is to mix the monomer with unsaturated styrenated polyester and antibacterial material and bring about the polymerization by conventional means. The polyester may be used alone or in admixture with polymer and/or suitable filler.

It is a well known fact that the addition of suitable fillers improves the physical properties of the plastic materials. Thus, in any of the antibacterial masses described above, inert fillers such as diatomaceous earth, carbon black, silica, silicates, powdered glass, alumina, pigments, etc. which do not interfere with the antibacterial action of the active material in the resin may be incorporated.

The polymer or copolymer may be obtained from the polymerizable ethenoids, such as the various esters of acrylic or methacrylic acid and an alcohol, such as methyl acrylate, methyl methacrylate, ethyl acrylate or ethyl methacrylate, acrylic acid, methacrylic acid, acrylonitrile, methacrylonitrile, styrene, vinyl toluene, suitable cross-linking monomer, vinyl acetate and various vinyl esters.

Since certain changes may be made in the above materials and since different embodiments of the invention could be made without departing from the scope thereof, it is intended that all matter contained in the above description shall be interpreted as illustrative only and not in a limiting sense. Thus, the term monomer implies a single monomer or a mixture of two or more monomers and the term polymer implies a homopolymer, a mixture of homopolymers, a copolymer of two or more monomers, a mixture of copolymers or a mixture of polymers and copolymers. Similarly, the term polyester is intended to mean a single polyester or a mixture of polyesters.

Suitable catalysts are the peroxides, e. g. benzoyl peroxide, phthaloyl peroxide, naphthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-tert. butyl peroxide, tert. butyl hydroperoxide, tetralin peroxide, 1-hydroxy cyclohexyl hydroperoxide-1, urea peroxide, etc., the per compounds, e. g. ammonium persulfate, sodium perchlorate, sodium perborate, potassium persulfate, etc., ozone, ozonides, etc., Lewis-acid type catalysts e. g., aluminum chloride, stannic chloride, etc., metal compounds of unsaturated acids such, for instance, as cobalt and manganese salts of linoleic acid, maleic acid, etc. Benzoyl peroxide is the preferred catalyst. The catalysts may be used alone or in admixture with one another. Any suitable amount of the catalyst or catalyst mixture may be used, but in general, the catalyst concentration that gives satisfactory results may be within the range of 0.1 to 2.0 percent by weight of the entire polymerizable mass.

The action of the catalysts may be enhanced by the use of suitable promoters or activators. A catalyst-promoter system can enable the polymerization to proceed at room temperature and bring about the polymerization of the entire mass in a much shorter time. A number of nitrogeneous compounds, e. g., amines, especially aromatic and aliphatic tertiary amines, azo compounds, etc.; aromatic sulfinic acids as disclosed in U. S. 2,567,803, certain sulfites like dibutyl sulfite, etc.; long chain aliphatic mercaptans, e. g. dodecyl mercaptan, etc. are capable of promoting the action of catalysts like peroxides, per compounds like persulfates etc. and bring about the polymerization at room temperature. The time required for such a polymerization will depend on the nature and amounts of the catalyst and promoter employed. In polymerizations of this type, it is generally desirable to employ polymer or copolymer along with the monomer mixture. Polymerization conditions may further be modified by the application of heat, light or heat and light, cooling at atmospheric, subatmospheric and superatmospheric pressure.

The following compounds are merely a few illustrative examples of the antibacterial materials which can be used to produce antibacterial resins, and which are obtained from phenols, thiophenols, substituted phenols, substituted thiophenols and organo-metallic derivatives of carboxy phenols and carboxy thiophenols such as salicylates and thiosalicylates of the general formulae:

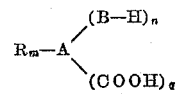

or

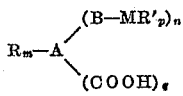

Zinc phenoxide
Aluminum p-methylphenoxide
Sodium methyl salicylate
Potassium p-chlorophenoxide
Zinc beta-naphthoxide
Borium 2,4,5-trichlorophenoxide
Sodium 2,3,4,5,6-pentachlorophenoxide
Zinc thiophenoxide
Sodium 2-chloro-6-phenylphenoxide
Zinc 2,4-dibromophenoxide
Aluminum p-methoxyphenoxide
Ethyl mercuri-thiosalicylic acid
Sodium ethyl mercuri-thiosalicylate
Zinc ethyl mercuri-thiosalicylate
Aluminum ethyl mercuri-thiosalicylate
Triphenyltin thiosalicylic acid The following examples are merely illustrative of my invention:

Example 1

A mixture of 10 ml. of methyl methacrylate, 0.5 g. of zinc phenoxide and 0.2 g. of benzoyl peroxide was placed in a test tube and sealed carefully. The test tube was placed in an oven at 60° C. for 24 hours. The polymerization proceeded smoothly. Samples of the polymerized material were placed in blood agar base medium inoculated with 1 ml. of undiluted saliva obtained by chewing paraffin. Zones of inhibition of bacterial growth were studied at 37° C. under aerobic and anaerobic conditions. The zones of inhibition were recorded after 48 hours. Similarly, zones of inhibition were studied under aerobic and anaerobic conditions when the medium used consisted of blood agar base plus 1% normal horse serum and was inoculated with 1 ml. of undiluted saliva. In these experiments, zone of inhibition varied from 1.0 cm. to 3.0 cm.

*Example 2*

The antibacterial resinous material was prepared as in Example 1 using aluminum p-methylphenoxide instead of zinc phenoxide. Samples were subjected to antibacterial tests as described in Example 1 and similar zones of inhibition were observed around the resinous material.

*Example 3*

Ten grams of polymethyl methacrylate powder wax mixed thoroughly with 0.2 g. of benzoyl peroxide and 0.5 g. of sodium 2,3,4,5,6-pentachlorophenoxide. The mixture was treated with 5 ml. of styrene and allowed to stand for a few minutes. The resulting mass of dough-like consistency was then placed in a mold and heated to 100° C. for about half an hour. The polymerized material was cut into small samples 1.3 cm. x 1.3 cm. which were studied for their antibacterial action as in Example 1. Zones of inhibition were observed around the plastic samples after 48 hours.

*Example 4*

Twenty parts of styrene and eighty parts of methyl methacrylate were mixed and one part of benzoyl peroxide and three parts of triphenyltin thiosalicylic acid were dissolved in it. The monomer mixture was added to three hundred parts of water and one part of sodium cellulose sulfate contained in a polymerization kettle which was vigorously agitated with a stirrer. The temperature of the entire mass was maintained at about 60° C. and the polymerization allowed to proceed for about six hours. The polymerized material was obtained in the form of very small pearls. The copolymer was filtered and dried. The dry copolymer weighed about sixty parts. The copolymer was found to have antibacterial properties.

*Example 5*

A copolymer of styrene and methyl methacrylate (containing 30 percent styrene in the copolymer) was mixed thoroughly with 2 percent by weight of benzoyl peroxide. Ten grams of this powder was mixed with 0.5 g. of potassium p-chlorophenoxide and 5 ml. of methyl methacrylate. The resulting mass of dough-like consistency was heated in a mold for half an hour at 100° C. The polymerized material was tested as in Example 3 and was found to have antibacterial properties.

*Example 6*

A copolymer of methyl methacrylate and acrylonitrile (containing 20 percent acrylonitrile in the copolymer) was mixed thoroughly with 2 percent by weight of p-chlorobenzoyl peroxide. Ten grams of this powder was mixed with 0.5 g. of sodium methyl salicylate and 2 g. of finely powdered silica. To the resulting mixture was added 6 ml. of ethyl methacrylate and mixed thoroughly until a dough-like mass was obtained. It was placed in a mold for half an hour at 100° C. The polymerized material was tested as in Example 3 and was found to have antibacterial properties.

*Example 7*

A mixture of 10 g. of polymethyl methacrylate, 0.2 g. of benzoyl peroxide and 0.5 g. of sodium ethyl mercuri-thiosalicylate was mixed thoroughly with 5 ml. of methyl methacrylate containing 0.5 percent by weight of N,N-dimethyl-p-toluidine. The dough-like mass was pressed into a mold and polymerized in about 10 minutes. The polymerized material was tested as in Example 3 and was found to have antibacterial properties.

*Example 8*

The experiment in Example 6 was repeated except that aluminum ethyl mercuri-thiosalicylate was used in place of sodium ethyl mercuri thiosalicylate. The polymerized material was tested as in Example 3 and showed antibacterial properties.

*Example 9*

A copolymer of styrene and methyl acrylate (containing 20 percent styrene in the copolymer) was mixed thoroughly with 2 percent by weight of benzoyl peroxide. To 10 g. of this powder was added 0.5 g. of barium 2,4,5-trichlorophenoxide and 5 ml. of methyl acrylate containing 0.5 percent of N,N-dimethyl-p-toluidine. The dough-like mixture was pressed into a mold and polymerized in about 10 minutes. The polymerized material showed antibacterial properties in the same manner as described in Example 3.

*Example 10*

A mixture of 10 g. of polymethyl methacrylate, 0.2 g. of benzoyl peroxide, 0.5 g. of zinc 2,4-dibromophenoxide was mixed thoroughly with 5 g. of an unsaturated styrenated polyester until a homogeneous mass was obtained. It was pressed into a mold and heated in an oven for two hours at 100° C. The polymerized material was tested as in Example 3 and was found to have antibacterial properties.

*Example 11*

The following ingredients were mixed thoroughly and placed in a mold for about 6 hours at 25° C.

|  | Grams |
|---|---|
| Copolymer of methyl methacrylate and styrene (50% styrene) | 10 |
| Unsaturated polyester containing monomer mixture | 5 |
| Benzoyl peroxide | 0.2 |
| Cumene hydroperoxide | 0.1 |
| Benzoin | 0.1 |
| Aluminum p-methoxyphenoxide | 0.5 |

The polymerized material was tested as in Example 3 and was found to have antibacterial properties.

*Example 12*

The following ingredients were mixed thoroughly and placed in a mold at 25° C. for two hours:

|  | Grams |
|---|---|
| Polydiethyleneglycol maleate | 7 |
| Styrene | 3 |
| Benzoyl peroxide | 0.2 |
| N-beta-hydroxyethyltetrahydroquinoline | 0.005 |
| Zinc ethyl mercuri-thiosalicylate | 0.5 |

The polymerized material was tested as in Example 3 and was found to have antibacterial properties.

*Example 13*

The following ingredients were mixed together thoroughly and placed in a mold at 75° C. for one hour.

|  | Grams |
|---|---|
| Polyethyleneglycol maleate | 7 |
| Styrene | 2 |
| Methyl methacrylate | 1 |
| Benzoyl peroxide | 0.2 |
| Zinc beta-naphthoxide | 0.5 |

The polymerized material was tested as in Example 3 and was found to possess antibacterial properties.

In the foregoing examples, it is seen that the proportion of metal phenate added to the polymerizable material, e. g., methacrylate ester, styrene, polyethylene glycol maleate, polydiethylene glycol maleate, mixtures thereof, etc., is from about 3.3% to about 5% per 100 parts of said polymerizable material.

The polymerizable material is selected from the group consisting of acrylic acid, methacrylic acid, esters of said acids, nitriles of said acids, vinyl esters, styrene, vinyl toluene, polyethylene glycol maleate, polydiethylene glycol maleate, and mixtures thereof.

By the terms "metal salt of a phenol" and "metal phenate" are meant metal phenates in which the metal atom is combined with the aromatic hydroxyl group of the phenol or thiophenol, as in zinc phenoxide and in which the metal atom so combined may be substituted with organo groups, specifically alkyl groups such as in zinc ethyl mercuric thiosalicylate, aluminum ethyl mercuric thiosalicylate, triphenyl tin thiosalicylic acid, etc.

Since certain changes may be made in the above processes and the antibacterial masses, and since different embodiments of the invention could be made without departure from the scope thereof, it is intended that all matter contained in the above description shall be interpreted as illustrative only and not in a limiting sense.

Thus, the term monomer implies a single monomer or a mixture of two or more monomers and the term polymer implies a homopolymer, a mixture of two or more homopolymers, a copolymer of two or more monomers, a mixture of copolymers or a mixture of homopolymers and copolymers, etc. Similarly, the term polyester means a single polyester or a mixture of polyesters.

It is thus to be understood that the following claims are intended to cover all the generic and specific features of the invention herein described and all statements of the scope of the invention which as a matter of language, might be said to fall thereunder.

I claim:

1. A method for uniformly incorporating an antibacterial metal phenate into a polymer comprising, adding from about 3.3 percent to about 5 percent of a metal salt of a phenol to 100 parts of a polymerizable material, said polymerizable material being selected from the group consisting of acrylic acid, methacrylic acid, esters of said acids, nitriles of said acids, vinyl esters, styrene, vinyl toluene, polyethylene glycol maleate, polydiethylene glycol maleate, and mixtures thereof, said metal salt being a phenate and said phenol being selected from the group consisting of phenols and thiophenols, said phenate being free from a compound which is a member of the group consisting of phenols and thiophenols which inhibit polymerization of said polymerizable material, and polymerizing said material in bulk in the presence of a polymerization catalyst therefor.

2. A method as claimed in claim 1 wherein said polymerization catalyst is benzoyl peroxide.

3. A method as claimed in claim 1 wherein said phenate is sodium 2,3,4,5,6-pentachlorophenoxide.

4. A method as claimed in claim 1 wherein said phenate is aluminum-p-methyl phenoxide.

5. A method as claimed in claim 1 wherein said phenate is sodium methyl salicylate.

6. A method as claimed in claim 1 wherein said phenate is barium 2, 4,5-trichlorophenoxide.

7. A method as claimed in claim 1 wherein said phenate is aluminum ethyl mercurithiosalicylate.

References Cited in the file of this patent

UNITED STATES PATENTS

| | | |
|---|---|---|
| 2,255,313 | Ellis | Sept. 9, 1941 |
| 2,491,287 | Smith | Dec. 13, 1949 |
| 2,552,328 | Kropa | May 8, 1951 |
| 2,552,329 | Kropa | May 8, 1951 |
| 2,567,910 | Malone | Sept. 11, 1951 |
| 2,608,551 | Benignus | Aug. 26, 1952 |
| 2,624,690 | Leader | Jan. 6, 1953 |
| 2,716,092 | Leistner et al. | Aug. 23, 1955 |
| 2,773,849 | Willis | Dec. 11, 1956 |